United States Patent
Okamoto et al.

(10) Patent No.: US 9,724,646 B2
(45) Date of Patent: Aug. 8, 2017

(54) SEPARATION MEMBRANE ELEMENT

(71) Applicant: TORAY INDUSTRIES, INC., Tokyo (JP)

(72) Inventors: Yoshiki Okamoto, Otsu (JP); Masakazu Koiwa, Otsu (JP); Hiroyuki Yamada, Otsu (JP); Kentaro Takagi, Otsu (JP); Hiroho Hirozawa, Otsu (JP); Tsuyoshi Hamada, Otsu (JP); Masahiro Kimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 260 days.

(21) Appl. No.: 14/410,804

(22) PCT Filed: Jun. 28, 2013

(86) PCT No.: PCT/JP2013/067824
§ 371 (c)(1),
(2) Date: Dec. 23, 2014

(87) PCT Pub. No.: WO2014/003170
PCT Pub. Date: Jan. 3, 2014

(65) Prior Publication Data
US 2015/0144550 A1    May 28, 2015

(30) Foreign Application Priority Data
Jun. 28, 2012  (JP) .................. 2012-145160

(51) Int. Cl.
*B01D 63/10* (2006.01)
*C02F 1/44* (2006.01)
*C02F 103/08* (2006.01)

(52) U.S. Cl.
CPC ........ *B01D 63/10* (2013.01); *B01D 2313/146* (2013.01); *C02F 1/44* (2013.01); *C02F 2103/08* (2013.01)

(58) Field of Classification Search
None
See application file for complete search history.

(56) References Cited

U.S. PATENT DOCUMENTS

| | | | |
|---|---|---|---|
| 4,802,982 A * | 2/1989 | Lien | ............. B01D 53/22 210/247 |
| 8,303,815 B2 | 11/2012 | Beppu | |
| 2014/0224726 A1 | 8/2014 | Kimura | |

FOREIGN PATENT DOCUMENTS

| | | |
|---|---|---|
| CN | 101098745 | 1/2008 |
| JP | 44014216 | 6/1969 |

(Continued)

OTHER PUBLICATIONS

Second Chinese Office Action mailed Apr. 12, 2016 for Chinese Application No. 201380034005.X, including English translation, 13 pages.

(Continued)

*Primary Examiner* — Chester Barry
(74) *Attorney, Agent, or Firm* — RatnerPrestia

(57) ABSTRACT

A separation membrane element includes a water collecting pipe, a separation membrane main body having a feed-side face and a permeate-side face, a feed-side channel material and permeate-side channel materials. The separation membrane main body, the feed-side channel material and the permeate-side channel materials are spirally wound around the water collecting tube. A plurality of the permeate-side channel materials are discontinuously provided on the permeate-side face of the separation membrane main body, along a first direction that is a longitudinal direction of the water collecting pipe. The feed-side channel material has a thickness of from 0.15 to 0.5 mm.

9 Claims, 6 Drawing Sheets

(56) References Cited

FOREIGN PATENT DOCUMENTS

| | | |
|---|---|---|
| JP | 0411928 | 1/1992 |
| JP | 10230140 | 9/1998 |
| JP | 11114381 | 4/1999 |
| JP | 11197469 | 7/1999 |
| JP | 11226366 | 8/1999 |
| JP | 2000237554 | 9/2000 |
| JP | 2006247453 | 9/2006 |
| JP | 2009028714 | 2/2009 |
| JP | 2012040487 | 3/2012 |
| WO | 2011152484 | 12/2011 |

OTHER PUBLICATIONS

Chinese Office Action mailed Aug. 4, 2015 in Chinese Application No. 201380034005.X, including English language translation.
International Search Report for International Application No. PCT/JP2013/067824 mailed Aug. 13, 2013.
Chinese Office Action for Chinese Application No. 201380034005.X, dated Sep. 20, 2016 with translation, 12 pages.
Notification of Reasons for Refusal for Japanese Application No. 2013-534112, dated Apr. 3, 2017, including English translation, 5 pages.

* cited by examiner

SEPARATION MEMBRANE ELEMENT

CROSS REFERENCE TO RELATED APPLICATIONS

This is the U.S. National Phase application of PCT/JP2013/067824, filed Jun. 28, 2013, which claims priority to Japanese Patent Application No. 2012-145160, filed Jun. 28, 2012, the disclosures of these applications being incorporated herein by reference in their entireties for all purposes.

TECHNICAL FIELD OF THE INVENTION

The present invention relates to a separation membrane element used to separate a component contained in a fluid, e.g., a liquid or a gas.

BACKGROUND OF THE INVENTION

There are various methods for separating a component contained in a fluid, e.g., a liquid or a gas. For example, with respect to the technique to remove ionic substances contained in seawater, brackish water, etc., a separation method by a separation membrane element is increasingly utilized as a process for energy saving and resource saving in recent years. The separation membranes for use in the separation method by a separation membrane element are classified, by the pore size and separating function, into a microfiltration membrane, an ultrafiltration membrane, a nanofiltration membrane, a reverse osmosis membrane, a forward osmosis membrane, etc., and these membranes are used, for example, for the production of drinkable water from seawater, brackish water, harmful substance-containing water, etc., for the production of industrial ultrapure water, for the wastewater treatment, or for the recovery of a valuable substance.

In the membrane separation element, a raw fluid is fed to one surface of the separation membrane and a permeated fluid is obtained through the other surface. By bundling a large number of separation membranes and incorporating the bundle into a separation membrane element, the membrane area per separation membrane element can be increased and therefore, the amount of a permeated fluid produced per separation membrane element can be increased. As the separation membrane element, various forms such as spiral type, hollow fiber type, plate-and-frame type, rotating flat-membrane type and flat-membrane integration type have been proposed so far.

For example, a fluid separation membrane element used for reverse osmosis filtration involves a feed-side channel material for feeding a raw fluid to a separation membrane surface, a separation membrane for separating a component contained in the raw fluid, and a permeate-side channel material for guiding, to the central tube, a permeated fluid passed through the separation membrane and separated from the feed fluid. A polymer-made net, etc. is used as the feed-side channel material, and a knit member called a tricot having a narrower interval than that of the feed-side channel material is used as the permeate-side channel material for the purpose of preventing sinking of the separation membrane and forming a permeate-side flow path. A separation membrane is overlapped with and bonded to both surfaces of the permeate-side channel material, whereby an envelope-shaped membrane is formed. The inside of the envelope-shaped membrane forms a flow path for a permeated fluid. The envelope-shaped membrane is stacked alternately with the feed-side channel material and after adhering a predetermined portion on the opening side to the peripheral surface of a water collecting pipe, wound spirally around the pipe.

In order to offer a high-performance separation membrane element, it has been proposed to increase the loading efficiency of the separation membrane. For example, in JP-A-10-230140, a feed-side channel material having a thickness of 0.1 to 0.5 mm has been proposed. In addition, in JP-A-2000-237554, a raw water channel material partially having a large thickness has been proposed.

Furthermore, it has been proposed to increase the amount of permeate produced with the separation membrane element by decreasing the flow resistance on the permeated side. In JP-A-2006-247453, a rugged sheet-like material has been proposed as the permeate-side channel material. In WO2011/152484, a non-continuous permeate-side channel material is arranged on the back surface side of the membrane.

SUMMARY OF THE INVENTION

The loading efficiency of the separation membrane can be increased by using a thin feed-side channel material, but due to the narrowed feed-side flow path, the pressure drop of the feed-side flow path increases. Accordingly, in the techniques of JP-A-10-230140 and JP-A-2000-237554, even if the loading efficiency of the separation membrane may be increased, the pressure drop in the separation membrane element becomes large and therefore, the amount of the permeate per unit membrane area decreases.

In addition, the technique of JP-A-2006-247453 is insufficient in the effect of reducing the flow resistance of the permeate-side channel material, and the effect of increasing the amount of permeate per unit membrane area is low. According to the method of WO2011/152484, the flow resistance of the permeate-side channel material is greatly reduced and therefore, the amount of the permeate per unit membrane area increases, but since the thickness of the feed-side channel material is large, the effect of increasing the rate of water production per separation membrane element is not enough.

An object of the present invention is to provide a separation membrane element capable of achieving both the increase in the amount of permeate per unit membrane area and the increase in the rate of water production per separation membrane element.

In order to attain the above-described object, one embodiment of the present invention has the following configurations (1) to (11).

(1) A separation membrane element including a water collecting pipe, a separation membrane main body having a feed-side face and a permeate-side face, a feed-side channel material, and a permeate-side channel material, in which the separation membrane main body, the feed-side channel material and the permeate-side channel material are spirally wound around the water collecting pipe, a plurality of the permeate-side channel materials are discontinuously provided on the permeate-side face of the separation membrane main body, along a first direction that is a longitudinal direction of the water collecting pipe, and the feed-side channel material has a thickness of from 0.15 to 0.5 mm.

(2) The separation membrane element according to (1), in which a length of the separation membrane main body in the first direction is from 100 to 350 mm.

(3) The separation membrane element according to (1) or (2), in which a length of the separation membrane main body in a second direction perpendicular to the first direction is from 500 to 1,700 mm.

(4) The separation membrane element according to any one of (1) to (3), in which the permeate-side channel materials have a thickness of from 0.12 to 0.4 mm.

(5) The separation membrane element according to any one of (1) to (4), in which spacings between the permeate-side channel materials adjacent to each other along the first direction are from 0.2 to 1.5 mm.

(6) The separation membrane element according to any one of (1) to (5), in which a sum of the thickness of the feed-side channel material and the thickness of the permeate-side channel material is from 0.4 to 0.75 mm.

(7) The separation membrane element according to any one of (1) to (6), in which the feed-side channel material has a plurality of fibers intersecting with each other, and an interval between intersections of the fibers in the first direction is from 1.5 to 8 mm.

(8) The separation membrane element according to (7), in which the fibers are inclined at 20° to 60° or at −60° to −20° relative to the first direction.

(9) The separation membrane element according to (1), in which a length of the separation membrane main body in the first direction is from 220 to 260 mm, a length of the separation membrane main body in a second direction perpendicular to the first direction is from 1,000 to 1,700 mm, and the number of pieces of the separation membrane main body is 1.

(10) The separation membrane element according to (1), in which a length of the separation membrane main body in the first direction is from 220 to 260 mm, a length of the separation membrane main body in a second direction perpendicular to the first direction is from 500 to 1,000 mm, and the number of pieces of the separation membrane main body is 2.

(11) The separation membrane element according to (1), in which a length of the separation membrane main body in the first direction is from 220 to 260 mm, a length of the separation membrane main body in a second direction perpendicular to the first direction is from 350 to 700 mm, and the number of pieces of the separation membrane main body is 3.

According to the separation membrane element of the present invention, the pressure drop in the separation membrane element can be reduced, so that even when the loading efficiency of the separation membrane is increased, the performance of the separation membrane can be sufficiently exerted without reducing the amount of the permeate per unit membrane area, and the amount of the permeate per unit membrane area as well as the rate of water production per separation membrane element can be increased.

DESCRIPTION OF EMBODIMENTS OF THE INVENTION

Embodiments for carrying out the present invention is described in detail below.

In this description, the expression "X contains Y as a main component" means that the content percentage of Y in X is 50 wt % or more, preferably 70 wt % or more, more preferably 80 wt % or more, still more preferably 90 wt % or more, and most preferably 95 wt % or more. In the case where a plurality components coming under Y are present, it may be sufficient if the total amount of the plurality of components satisfies the range above.

[1. Separation Membrane]

(1-1) Outline

The separation membrane is a membrane capable of separating a component in a fluid fed to the separation membrane surface and obtaining a permeated fluid passed through the separation membrane. The separation membrane has a separation membrane main body and a channel material arranged on the separation membrane main body.

Figure 1:
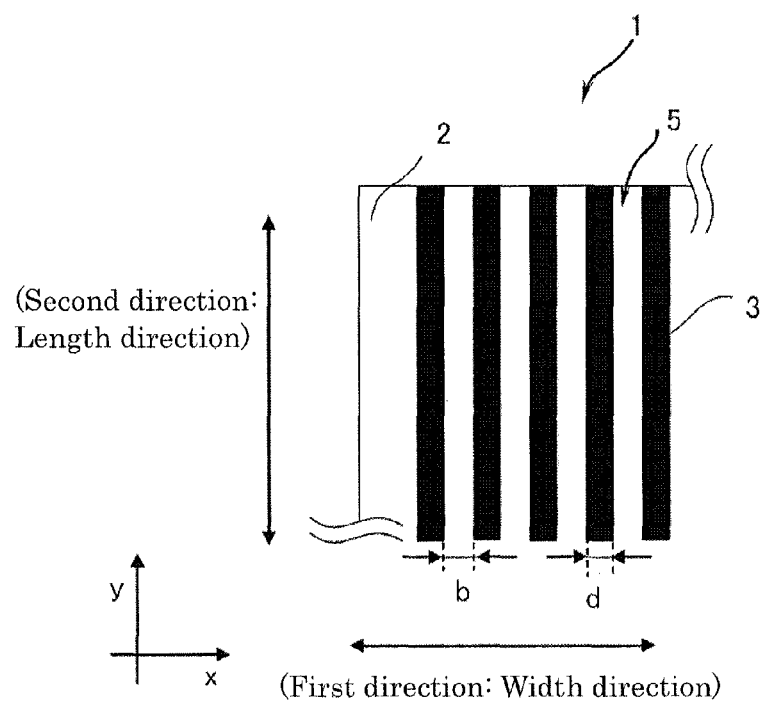
FIG. 1 is a plan view of a separation membrane having permeate-side channel materials discontinuously provided in the width direction of the separation membrane.
Figure 2:
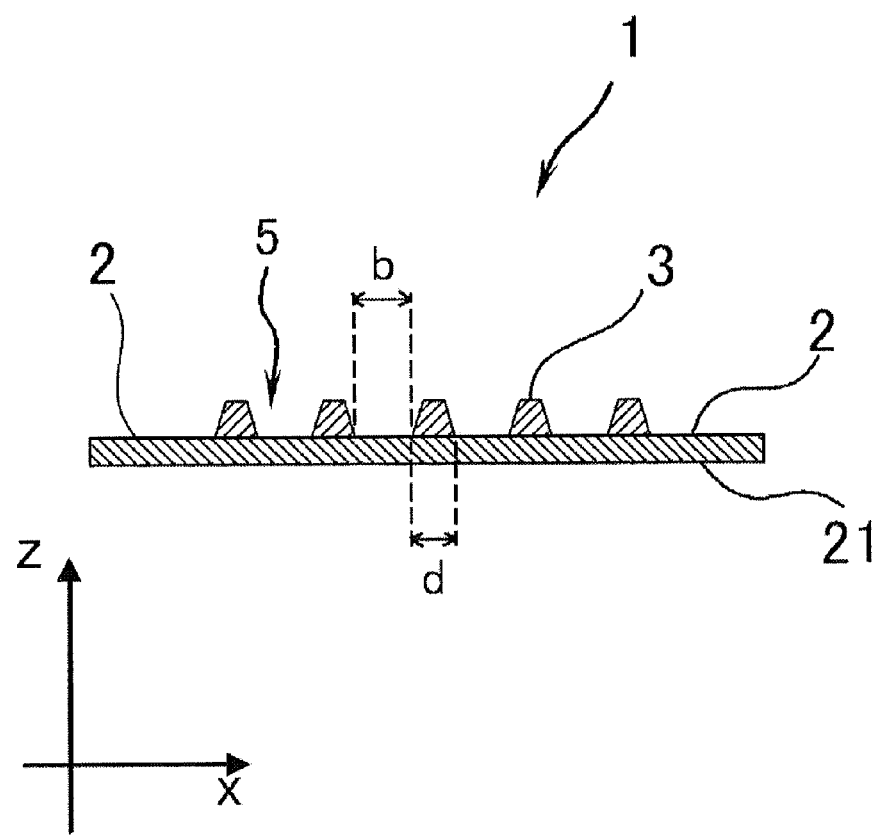
FIG. 2 is a cross-sectional view of the separation membrane depicted in FIG. 1.

As an example of such a separation membrane, the separation membrane 1 in an embodiment of the present invention has, as shown in FIGS. 1 and 2, a separation membrane main body 2 and permeate-side channel materials (channel materials) 3. The separation membrane main body 2 has a feed-side face 21 and a permeate-side face 22.

In the description of the present invention, the "feed-side face" of the separation membrane main body means, out of two faces of the separation membrane main body, a surface on the side to which a raw fluid is fed. The "permeate-side face" means a surface on the opposite side thereof. In the case where the separation membrane main body has a substrate and a separation functional layer as described later, in general, the face on the separation functional layer side is the feed-side face or the front side, and the face on the substrate side is the permeate-side face or the rear side.

In one embodiment, the channel materials 3 are provided on the permeate-side face 22 of the separation membrane main body 2 to form a permeate-side flow path (flow path) 5. Respective parts of the separation membrane 1 are described in detail later.

Figure 3:
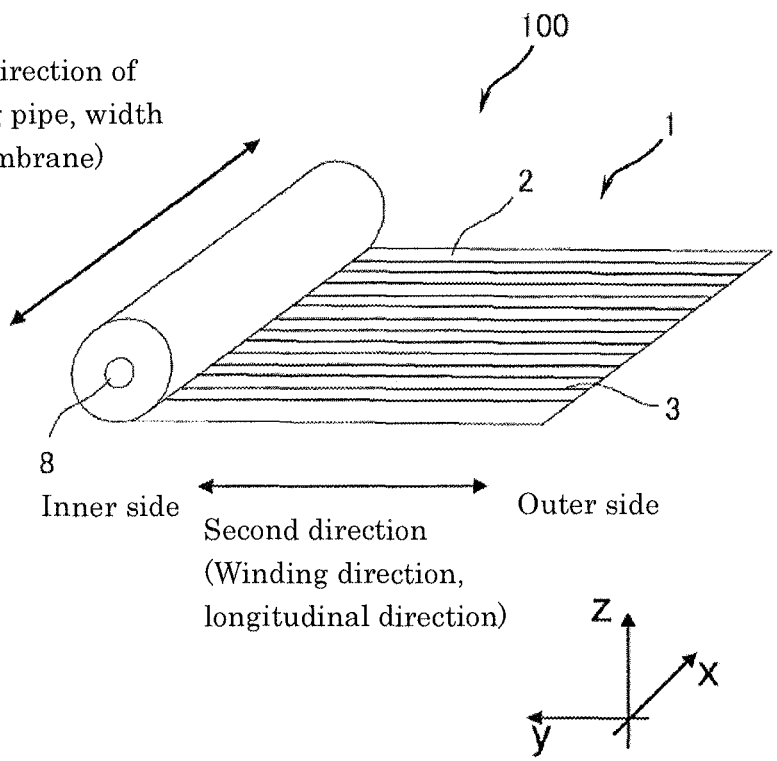
FIG. 3 is a developed perspective view showing one embodiment of the separation membrane element.
Figure 4:
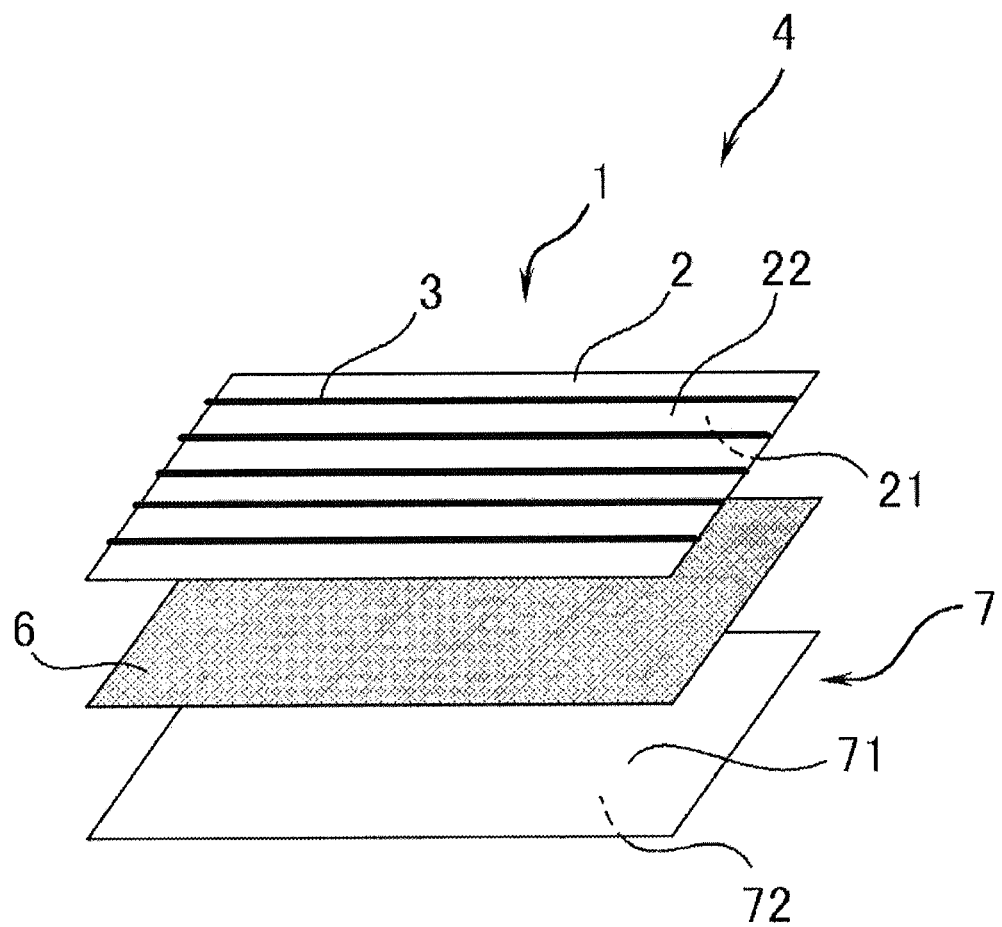
FIG. 4 is a developed perspective view showing one embodiment of the separation membrane pair.

In the figures, directional axes of x-axis, y-axis and z-axis are depicted. The x-axis is sometimes referred to as the first direction, and the y-axis is sometimes referred to as the second direction. As shown in FIGS. 3 and 4, the separation membrane main body 2 can be rectangular in shape, and the first direction and the second direction are parallel to outer edges of the separation membrane main body 2. The first direction is sometimes referred to as the width direction, and the second direction is sometimes referred to as the longitudinal direction.

(1-2) Separation Membrane Main Body

<Outline>

As the separation membrane main body, a membrane having a separation performance appropriate for the use method, purpose, etc. is used. The separation membrane main body may be formed by a single layer or may be a composite membrane having a separation functional layer and a substrate. In the composite membrane, a porous support layer may be provided between the separation functional layer and the substrate.

<Separation Functional Layer>

The thickness of the separation functional layer is not limited to a specific numerical value but is preferably from 5 to 3,000 nm in view of separation performance and permeation performance. Among others, in a reverse osmosis membrane, a forward osmosis membrane and a nanofiltration membrane, the thickness thereof is preferably from 5 to 300 nm.

The thickness of the separation functional layer can be measured in conformity with the conventional method for measuring the thicknesses of a separation membrane. For example, the separation membrane is embedded in a resin and sliced to produce an ultrathin section, and the obtained section is subjected to a treatment such as dyeing and then observed with a transmission electron microscope, whereby the thickness can be measured. In the case where the separation functional layer has a protuberance structure, the thickness is measured at intervals of 50 nm in the cross-sectional longitudinal direction of a protuberance structure located above the porous support layer and by measuring on 20 protuberances, the thickness can be determined from the average thereof.

The separation functional layer may be a layer having both a separation function and a supporting function or may have only a separation function. The "separation functional layer" indicates a layer having at least a separation function.

In the case where the separation functional layer has both a separation function and a supporting function, a layer containing cellulose, polyvinylidene fluoride, polyethersulfone or polysulfone as a main component is preferably used as the separation functional layer.

On the other hand, a crosslinked polymer is preferably used as the separation functional layer, because the pore size control is easy and the durability is excellent. In particular, from the standpoint that the separation performance for a component in the raw fluid is excellent, a polyamide separation functional layer formed by the polycondensation of a polyfunctional amine and a polyfunctional acid halide, an organic-inorganic hybrid functional layer, and the like are suitably used. Such a separation functional layer can be obtained by the polycondensation of monomers on a porous support layer.

For example, the separation functional layer can contain a polyamide as a main component. Such a membrane can be formed by performing interfacial polycondensation of a polyfunctional amine and a polyfunctional acid halide according to a known method. For example, an aqueous polyfunctional amine solution is applied to the porous support layer, an excess aqueous amine solution is removed with an air knife, etc., and thereafter, a polyfunctional acid halide-containing organic solvent solution is applied, whereby a polyamide separation functional layer is obtained.

In addition, the separation functional layer may have an organic-inorganic hybrid structure containing Si element, etc. The separation functional layer having an organic-inorganic hybrid structure may contain, for example, the following compounds (A) and (B):

(A) a silicon compound in which an ethylenically unsaturated group-containing reactive group and a hydrolyzable group are directly bonded to a silicon atom, and (B) a compound that is a compound except for the compound (A) and has an ethylenically unsaturated group.

Specifically, the separation functional layer may contain a condensation product of the hydrolyzable group of the compound (A) and a polymerization product of the ethylenically unsaturated group of the compounds (A) and/or (B).

That is, the separation functional layer may contain at least one polymerization product selected from:

a polymerization product formed by condensing and/or polymerizing only the compound (A), a polymerization product formed by polymerizing only the compound (B), and a copolymerization product of the compound (A) and the compound (B).

Incidentally, the polymerization product includes a condensate. In the copolymer of the compound (A) and the compound (B), the compound (A) may be condensed through the hydrolyzable group.

The hybrid structure can be formed by a known method. One example of the method for forming a hybrid structure is as follows. A reaction solution containing the compound (A) and the compound (B) is applied on a porous support layer. The excess of the reaction solution is removed, and then heat treatment may be carried out for the purpose of condensing hydrolysable groups. As the method for polymerizing the ethylenically unsaturated groups of the compounds (A) and (B), a heat treatment, irradiation with electromagnetic waves, irradiation with electron beams, or plasma irradiation may be performed. For the purpose of increasing the polymerization rate, a polymerization initiator, a polymerization accelerator, etc. may be added at the time of formation of the separation functional layer.

In all separation functional layers, the membrane surface may be hydrophilized with, for example, an alcohol-containing aqueous solution or an aqueous alkali solution before use.

<Porous Support Layer>

The porous support layer is a layer supporting the separation functional layer, and a porous resin layer is another word therefore.

The material used for the porous support layer and the shape thereof are not particularly limited, but the layer may be formed on the substrate, for example, by using a porous resin. A polysulfone, a cellulose acetate, a polyvinyl chloride, an epoxy resin, and a mixture or laminate thereof are used for the porous support layer, and it is preferable to use a polysulfone that is highly stable chemically, mechanically and thermally and facilitates pore diameter regulation.

The porous support layer imparts mechanical strength to the separation membrane and unlike the separation membrane, does not need a separation performance for a component having a small molecular size, such as ion. The pore of the porous support layer is not particularly limited in its size and distribution, but the porous support layer may have uniform and fine pores or may have a pore size distribution where the pore size is gradually increased from a surface on the separation functional layer-forming side to another surface. In either case, the projection area equivalent-circle diameter of fine pores measured on the separation functional layer-forming side surface by using an atomic force microscope, an electron microscope, etc. is preferably from 1 to 100 nm. Above all, in view of interfacial polymerization reactivity and holding of the separation functional layer, the pore on the separation functional layer-forming side surface of the porous support layer preferably has a projection area equivalent-circle diameter of 3 to 50 nm.

The thickness of the porous support layer is not particularly limited, but for the reason that, e.g., strength is imparted to the separation membrane, the thickness is preferably from 20 to 500 μm, more preferably from 30 to 300 μm.

The configuration of the porous support layer can be observed by a scanning electron microscope, a transmission electron microscope, or an atomic force microscope. For example, at the time of observation by a scanning electron microscope, the porous support layer is peeled off from the substrate and then cut by a freeze-cutting method to obtain a sample for cross-sectional observation. This sample is thinly coated with platinum, platinum-palladium or ruthenium tetrachloride, preferably with ruthenium tetrachloride, and then observed by a high-resolution field-emission scanning electron microscope (UHR-FE-SEM) at an accelerating voltage of 3 to 6 kV. As to the high-resolution field-emission scanning electron microscope, for example, an electron microscope, Model S-900, manufactured by Hitachi, Ltd. can be used. Based on the electron photomicrograph obtained, the membrane thickness of the porous support layer and the projection area equivalent-circle diameter of the surface can be measured.

The thickness and pore diameter of the porous support layer are an average value. As defined herein, the thickness of the porous support layer is an average value of 20 points obtained by measuring, in the cross-sectional observation, the thickness at intervals of 20 μm in a direction perpendicular to the thickness direction. As defined herein, the pore diameter is an average value of respective projection area equivalent-circle diameters measured on 200 pores.

The method for forming the porous support layer is described below. The porous support layer can be produced, for example, by casting an N,N-dimethylformamide (hereinafter referred to as DMF) solution of the polysulfone on the later-described substrate, for example, on a densely woven polyester fabric or a nonwoven fabric, to a certain thickness, and wet-coagulating the solution in water.

The porous support layer can be formed according to the method described in "Office of Saline Water Research and Development Progress Report", No. 359 (1968). Here, the polymer concentration, solvent temperature and poor solvent can be adjusted so as to obtain a desired configuration.

For example, a predetermined amount of a polysulfone is dissolved in DMF to prepare a polysulfone resin solution having a predetermined concentration. Subsequently, this polysulfone resin solution is coated to a substantially constant thickness on a substrate including a polyester fabric or nonwoven fabric and after removing the solvent on the surface in air for a certain period, the polysulfone is coagulated in a coagulating solution, whereby the porous support layer can be obtained.

<Substrate>

In view of strength, dimensional stability, etc. of the separation membrane main body, the separation membrane main body may have a substrate. As the substrate, a fibrous substrate is preferably used because of its strength, ruggedness-forming ability, and fluid permeability.

As for the substrate, both a long-fiber nonwoven fabric and a short-fiber nonwoven fabric may be preferably used. Among others, a long-fiber nonwoven fabric has excellent film formability and therefore, makes it possible to prevent the solution of a high-molecular polymer from excessively infiltrating to reach the back surface when the solution is cast, prevent the porous support layer from peeling off, prevent the membrane from becoming uneven due to fluffing of the substrate, and prevent generation of a defect such as pinhole. In addition, when the substrate includes a long-fiber nonwoven fabric formed from thermoplastic continuous filaments, compared with a short-fiber nonwoven fabric, the membrane can be prevented from disproportionation and defect generation, which are caused by fluffing of fiber at the time of casting of a polymer solution. Furthermore, since a tension is imposed in the machine direction at the time of continuous production of a separation membrane, a long-fiber nonwoven fabric excellent in the dimensional stability is preferably used as the substrate.

In the long-fiber nonwoven fabric, from the viewpoint of formability and strength, fibers in the surface layer opposite to the porous support layer preferably have a higher degree of longitudinal orientation than fibers in the surface layer on the porous support layer side. This structure is advantageous in that not only a high effect of preserving the strength thereby preventing membrane rupture, etc. is realized but also the formability as a laminate including a porous support layer and a substrate is enhanced when imparting ruggedness to the separation membrane, and the rugged profile of the separation membrane surface is stabilized.

More specifically, in the long-fiber nonwoven fabric, the degree of fiber orientation in the surface layer opposite to the porous support layer is preferably from 0° to 25°, and the orientation degree difference from the degree of fiber orientation in the surface layer on the porous support layer side is preferably from 10° to 90°.

The production process of the separation membrane or the production process of the element according to an embodiment of the present invention involves a heating step, and there arises a phenomenon that the porous support layer or the separation functional layer contracts due to heating. In particular, the contraction is prominent in the width direction where a tension is not imposed at the time of continuous film formation. Since the contraction poses a problem with the dimensional stability, etc., a substrate having a low rate of thermal dimensional change is preferred. In the nonwoven fabric, when the difference between the degree of fiber orientation in the surface layer opposite to the porous support layer and the degree of fiber orientation in the surface layer on the porous support layer side is from 10° to 90°, the thermal change in the width direction can also be advantageously diminished.

The degree of fiber orientation is an index indicating the fiber direction of a nonwoven fabric substrate constituting the porous support layer. Specifically, as defined herein, the degree of fiber orientation is an average value of angles of fibers constituting the nonwoven fabric substrate, relative to the machine direction at the time of continuous film formation, i.e., the longitudinal direction of the nonwoven fabric substrate. In other words, when the longitudinal direction of the fiber is parallel to the machine direction, the degree of fiber orientation is 0°, and when the longitudinal direction of the fiber is orthogonal to the machine direction, i.e., parallel to the width direction of the nonwoven fabric substrate, the degree of fiber orientation is 90°. Accordingly, a fiber orientation degree closer to 0° indicates longitudinal orientation, and a fiber orientation degree closer to 90° indicates transverse orientation.

The degree of fiber orientation is measured as follows. First, 10 small piece samples are randomly collected from the nonwoven fabric, and the sample surface is photographed by a scanning electron microscope at a magnification of 100 to 1,000 times. In the photographed image, 10 fibers are selected per sample and measured for the angle by taking the angle in the longitudinal direction of the nonwoven fabric (longitudinal direction, machine direction) as 0°. That is, the angle is measured on a total of 100 fibers per one nonwoven fabric. The average value of angles measured on 100 fibers is calculated. The value obtained by rounding off the obtained average value to the nearest whole number is the degree of fiber orientation.

The total thickness of the substrate and the porous support layer is preferably set to a range from 0.03 to 0.3 mm, more preferably from 0.05 to 0.25 mm.

In an embodiment of the present invention, the suitable configuration of the separation membrane main body may be appropriately selected according to the size of the water collecting pipe used or the size of the pressure vessel for housing the separation membrane element, but in view of water production efficiency, one separation membrane main body having a first direction length of 220 to 260 mm and a second direction length of 1,000 to 1,700 mm is preferably used. It is also preferable to use two separation membrane main bodies having a first direction length of 220 to 260 mm and a second direction length of 500 to 1,000 mm or use three separation membrane main bodies having a first direction length of 220 to 260 mm and a second direction length of 350 to 700 mm.

(1-3) Permeate-Side Channel Material

As shown in FIGS. 1 and 2, on the permeate-side face 22 of the separation membrane main body 2, a plurality of permeate-side channel materials (channel materials) 3 can be provided to form permeate-side flow paths 5. The expression "provided to form permeate-side flow paths" means that the channel materials are formed so that when the separation membrane is incorporated into the later-described separation membrane element, the permeated fluid passed through the separation membrane main body can reach the water collecting pipe.

From the standpoint of forming a flow path 5 on the permeate-side face 22 of the separation membrane main body 2, the channel materials 3 are preferably provided discontinuously at least along the first direction. The term "discontinuous" indicates a structure where when the channel materials 3 are peeled off from the separation membrane main body 2, the plurality of channel materials 3 are parted away from each other. On the other hand, the member such as net, tricot and film has a continuous shape as one body even when separated from the separation membrane main body 2 and therefore, is not discontinuous.

According to an embodiment of the present invention, the plan shape of the channel materials 3 provided on the separation membrane main body 2 specifically includes a dot shape, a particle shape, a linear shape, a semispherical shape, a columnar shape (including cylindrical column, prismatic column, etc.), a wall shape, etc. A plurality of linear or wall-shaped channel materials provided on one separation membrane main body 2 may be sufficient if they are arranged not to intersect with each other, and specifically, the channel materials may be arranged substantially in parallel with each other. As an example of the configuration "arranged substantially in parallel", the channel materials may be arranged not to intersect on the separation membrane or the angle between longitudinal directions of adjacent channel materials may be from 0° to 30°. The angle between longitudinal directions of adjacent channel materials is preferably from 0° to 15°, more preferably from 0° to 5°.

In an embodiment of the present invention, the permeate-side channel materials 3 provided on the separation membrane main body 2 can be formed of a resin, and the shape of individual resin bodies is not particularly limited but may be sufficient if the flow resistance of the permeated fluid flow path can be reduced and when a raw fluid is fed to or passed through the separation membrane element, the flow path can be stabilized. The plan shape of one unit of the permeate-side channel materials when viewed from a direction perpendicular to the permeate-side face of the separation membrane includes, for example, an ellipse, a circle, an elongated circle, a trapezoid, a triangle, a rectangle, a square, a parallelogram, a rhombus, and an irregular shape. Furthermore, the permeate-side channel materials may have, in the cross-section perpendicular to the plane direction of the separation membrane, any of a shape where the width increases from the upper part toward the lower part (i.e., from the peak in the thickness direction of the permeate-side channel materials toward the separation membrane main body on which the permeate-side channel materials are provided), a shape where the width decreases, and a shape where the width is constant.

The method for forming the permeate-side channel materials 3 provided on the separation membrane main body 2 is not particularly limited, but in the case of a continuous shape, a method of stacking previously processed channel materials on the permeate-side face of the separation membrane main body is preferred. In the case of a discontinuous shape, a method of directly arranging a material constituting the permeate-side channel materials on the permeate-side face of the separation membrane main body by printing, spraying, coating with an applicator, hot-melt processing, etc. is used.

As for the thickness of the permeate-side channel materials in the separation membrane, when the thickness is large, the flow resistance of the permeate-side flow path may become small, but the membrane area capable of being wound around the later-described water collecting pipe is reduced. When the thickness is small, the membrane area capable of being wound around may be increased, but the flow resistance becomes large. In view of balance therebetween, the thickness of the permeate-side channel materials is preferably from 0.12 to 0.4 mm, more preferably from 0.16 to 0.35 mm, still more preferably from 0.2 to 0.3 mm. Within such a range, a stable flow path for the permeated fluid can be ensured.

The thickness of the permeate-side channel materials corresponds to the difference in height between the permeate-side face of the separation membrane main body and the permeate-side channel materials.

The thickness of the permeate-side channel materials is a value obtained by measuring the thickness on channel materials 3 at 30 or more positions and averaging the measured values. When the number of channel materials included in one cross-section is 30 or more, the thickness can be obtained in one cross-section. When the number of channel materials 3 included in one cross-section is less than 30, the thickness can be measured in a plurality of cross-sections.

As shown in FIGS. 1 and 2, the spacings b between permeate-side channel materials 3 adjacent to each other along the first direction can correspond to the width of the flow path 5. A large spacing is advantageous in that the pressure drop decreases, whereas a small spacing is advantageous in that the membrane sinking is less likely to occur. In view of balance therebetween, the spacing is preferably from 0.2 to 1.5 mm. Within this range, sinking of the membrane can be prevented and moreover, the pressure drop can be reduced. The spacing is more preferably from 0.22 to 1 mm, still more preferably from 0.25 to 0.6 mm.

In the case where the width of one flow path 5 is not constant in one cross-section, that is, when the side surfaces of two adjacent channel materials 3 are not parallel, an average value of maximum and minimum width values of one flow path 5 is measured in one cross-section, and an average value of the measured values is calculated. As shown in FIG. 2, when the channel materials 3 have, in the cross-section perpendicular to the second direction, a trapezoidal cross-sectional shape with a narrow top and a wide bottom, the distance between tops of two adjacent channel materials 3 and the distance between bottoms thereof are measured, and an average value thereof is calculated. The spacings of channel materials 3 are measured in cross-sections at arbitrary 30 portions or more, an average value of measured values is calculated, and an arithmetic average value thereof is further calculated, whereby the value of the spacings is obtained.

The width d of the channel materials 3 is preferably 0.2 mm or more, more preferably 0.3 mm or more. With a width of 0.2 mm or more, even when a pressure is imposed on the channel materials 3 at the time of operation of the separation membrane element, the channel materials can maintain its shape and stably form the permeate-side flow path. The width d is preferably 2 mm or less, more preferably 1.5 mm or less. With a width of 2 mm or less, the permeate-side flow path can be sufficiently ensured.

As to the width d of the channel materials 3, an average value of the maximum width and the minimum width of one channel material 3 in one cross-section perpendicular to the second direction can be calculated. More specifically, in channel materials 3 where the top is narrow and the bottom is wide as shown in FIG. 2, the bottom width and the top width of the channel materials are measured, and an average value of the measured values is calculated. This average value is calculated in cross-sections at least at 30 portions, and an arithmetic average thereof is calculated.

In the case of arranging the permeate-side channel materials, for example, by hot-melt processing, the thickness of the permeate-side channel materials 3 provided on the permeate-side face 22 can be freely adjusted to satisfy the required conditions of separation properties and permeation performance by changing the treatment temperature and the hot-melt resin selected.

The thickness of the permeate-side channel materials 3 provided on the permeate-side face 22 can be measured using a commercially available shape measurement system, etc. For example, the thickness can be measured by thickness measurement or the like from a cross-section with a laser microscope. The measurement is made at arbitrary portions where permeate-side channel materials are present, and the value as a sum total of respective thickness values is divided by the total number of measurement portions, whereby the thickness can be determined.

In order to obtain a good recovery ratio of the permeated fluid when the permeate-side channel materials 3 provided on the permeate-side face are incorporated into a separation membrane element, the permeate-side flow path 5 may be provided to continue from one end to another end of the separation membrane 1. As an example of this configuration, the flow path 5 is continuously formed along the second direction. Such a flow path 5 is formed when a plurality of channel materials 3 are discontinuously arranged along the first direction.

More specifically, as shown in FIG. 3, when the separation membrane 1 is incorporated into a separation membrane element 100, the channel materials 3 can be arranged to continue from the inner-side end part to the outer-side end part in the winding direction. The inner side in the winding direction is, in the separation membrane 1, a side close to the water collecting pipe 8, and the outer side in the winding direction is, in the separation membrane 1, a side remote from the water collecting pipe 8. In the case where one channel material 3 is continuously provided in the winding direction as shown in FIG. 3, sinking of the membrane is suppressed at the time of pressurized filtration. The sinking of the membrane means that the membrane sinks into the flow path to narrow the flow path.

In particular, the channel materials 3 are preferably arranged to be substantially perpendicular to the water collecting pipe 8. The term "substantially perpendicular" specifically indicates a state where the angle between the water collecting pipe 8 and the channel materials 3 is from 75° to 105°.

The channel materials 3 provided on the permeate-side face 22 are preferably formed of a material different from the separation membrane main body 2. The different material means a material having a composition different from that of the material used for the separation membrane main body 2. Among others, the composition of the channel materials 3 is preferably different from the composition of the surface on which the channel materials 3 are formed, i.e., the permeate-side face 22, of the separation membrane main body 2 and is preferably different from the composition of any layer forming the separation membrane main body 2.

The component constituting the channel materials 3 provided on the permeate-side face 22 is not particularly limited but, in view of chemical resistance and pressure resistance, is preferably an ethylene vinyl acetate copolymer resin, a polyolefin such as polyethylene and polypropylene, a copolymerized polyolefin, etc., and a polymer such as urethane resin and epoxy resin may also be selected. However, when a thermoplastic resin is used, molding is easy and therefore, the shape of the channel materials 3 can be made uniform.

In FIG. 1, the plan shape of the channel materials 3 is linear in the longitudinal direction. However, the channel materials may be changed to other shapes as long as the channel materials 3 are protruded relative to the surface of the separation membrane main body 2 and the desired effects of the separation membrane element are not impaired. That is, the shape in the planar direction of the channel materials may be a curved line, a wavy line, etc. In addition, a plurality of channel materials included in one separation membrane may be formed to differ from each other in at least either one of the length and the width.

In FIG. 2, a trapezoid is depicted as the cross-sectional shape (the shape in the cross-section perpendicular to the second direction) of the channel materials 3. However, the cross-sectional shape of the channel materials can be changed to a rectangle, a semicircle, a circle, an ellipse, or other shapes. For example, the shape of the channel materials may be a straight column, a curved column, or a combination thereof.

For stably forming the flow path 5, it is preferred that the sinking of the separation membrane main body 2 can be suppressed when the separation membrane main body 2 is pressurized in the separation membrane element 100. To this end, the contact area between the separation membrane main body 2 and the channel materials 3 is preferably large, i.e., the area of the channel materials 3 relative to the area of the separation membrane main body 2 (the projection area on the membrane surface of the separation membrane main body) is preferably large. On the other hand, for decreasing the pressure drop, the cross-sectional area of the flow path 5 is preferably large. In addition, the shape of the channel materials 3 may be, in terms of the cross-sectional shape in a direction perpendicular to the winding direction, a straight column with no change in the width. Furthermore, the shape may be, in terms of the cross-sectional shape in a direction perpendicular to the winding direction, a shape having a change in the width, such as trapezoidal wall-shaped material, elliptic column, elliptic cone, quadrangular pyramid or hemisphere.

The conventional channel material such as tricot is a knitted material and therefore, all differences in height cannot be utilized as a groove, but in the channel materials 3, all differences in height thereof can be utilized as a groove of the flow path 5, as a result, even when the thickness of the channel materials 3 is the same as the thickness of the tricot, a wide flow path in the thickness direction and a small pressure drop are achieved, leading to an increase in the amount of water produced with the membrane separation element.

The channel materials 3 may impregnate the separation membrane main body 2, more specifically, the substrate, with the component of the channel materials 3. When the channel materials 3 are arranged on the substrate side, i.e., the permeate-side face, of the separation membrane main body and heated from the substrate side by a hot-melt method, etc., impregnation with the channel materials 3 proceeds from the rear side to the front side of the separation membrane. Along with the progress of impregnation, the adhesion between the channel materials 3 and the substrate is strengthened and even when pressurized filtration is performed, the substrate is less likely to peel off from the channel materials 3.

However, if the component of the channel materials 3 permeates the substrate and impregnates the neighborhood of the separation functional layer of the porous support layer, the impregnating channel materials 3 may break down the separation functional layer when pressurized filtration is performed. For this reason, in the case where the substrate is impregnated with the component of the channel materials 3, the ratio of the impregnation thickness of the channel materials to the thickness of the substrate (i.e., impregnation ratio) is preferably from 5 to 95%, more preferably from 10 to 80%, still more preferably from 20 to 60%. Here, the impregnation thickness means the maximum value of the thickness of the impregnated part corresponding to one channel material 3 in one cross-section.

The thickness of impregnation with the channel materials 3 can be adjusted, for example, by changing the kind of the material constituting the channel materials 3 (more specifically, the kind of the resin) and/or the amount of the material. In the case of providing the channel materials 3 by a hot-melt method, the impregnation thickness can also be adjusted by changing the treatment temperature, etc.

In this connection, when the substrate including the impregnated part with the channel materials 3 is subjected to thermal analysis such as differential scanning calorimetry and a peak assignable to the component of the channel materials 3 is obtained separately from a peak assigned to the substrate, it can be confirmed that the substrate is impregnated with the channel materials 3.

As for the impregnation ratio of the substrate with the channel materials 3, the thickness of impregnation with the channel materials 3 and the substrate thickness can be calculated by observing a cross-section of the separation membrane, where the channel materials 3 are present, with a scanning electron microscope, a transmission electron microscope or an atomic force microscope. For example, in the case of observation with a scanning electron microscope, the separation membrane main body is cut in the depth direction together with the channel materials 3, and the impregnation thickness and the substrate thickness are measured by observing the cross-section with a scanning electron microscope. Then, the impregnation ratio can be calculated from the ratio between the maximum impregnation thickness, i.e., the thickness when the substrate is maximally impregnated with the channel materials, and the substrate thickness. Incidentally, the "substrate thickness" when calculating the impregnation depth is the thickness of the substrate corresponding to a portion where the maximum impregnation thickness is measured.

[2. Separation Membrane Element]

(2-1) Outline

As shown in FIG. 3, the separation membrane element 100 can include a water collecting pipe 8 and a separation membrane 1 having any one of the above-described configurations and being wound around the periphery of the water collecting pipe 8. In addition, the separation membrane element 100 further includes members not shown, such as end plate. The separation membrane element 100 is a so-called spiral-type element.

(2-2) Separation Membrane

In one embodiment, the separation membrane 1 is spirally wound around the periphery of the water collecting pipe 8, and its width direction is arranged to run along the longitudinal direction of the water collecting pipe 8. As a result, the separation membrane 1 is arranged such that its longitudinal direction runs along the winding direction.

Accordingly, the channel materials 3 as a wall-shaped member can be arranged discontinuously at least along the longitudinal direction of the water collecting pipe 8, in the permeate-side face 22 of the separation membrane main body 2 constituting the separation membrane 1. In other words, the flow path 5 is formed to continue in the winding direction from the outer-side end part to the inner-side end part of the separation membrane 1. As a result, the permeate readily reaches the central pipe of the water collecting pipe 8, i.e., the flow resistance is reduced, and therefore, a high rate of water production is obtained.

The "inner side in the winding direction" and the "outer side in the winding direction" are as shown in FIG. 3. That is, the "inner side in the winding direction" and the "outer side in the winding direction" correspond respectively to the end part close to the water collecting pipe 8 in the separation membrane 1 and the end part remote from the water collecting pipe.

As described above, the channel materials need not reach the edge of the separation membrane and therefore, for example, a channel material need not be provided in the outer-side end part of an envelope-shaped membrane in the winding direction as well as in the end part of the envelope-shaped membrane in the longitudinal direction of the water collecting pipe.

As shown in FIG. 4, the separation membrane can form a separation membrane pair 4. A separation membrane 1 is disposed by arranging the feed-side face 21 to face the feed-side face 71 of another separation membrane 7 through a feed-side channel material 6. In the separation membrane element 100, a feed-side flow path is formed between feed-side faces of separation membranes facing each other, and a permeate-side flow path is formed between permeate-side faces thereof.

In addition, another separation membrane not shown can be further stacked on the separation membrane 1 to form an envelope-shaped membrane together with the separation membrane 1. The envelope-shaped membrane is a set of two separation membranes combined by arranging the permeate-side faces to face each other. The envelope-shaped membrane is rectangular in shape, where a space between permeate-side faces is opened only at one side on the inner side in the winding direction and sealed at the other three sides so that the permeate can flow into the water collecting pipe 8. In this way, the separation membrane forms an envelope-shaped membrane with the permeate-side face facing inward. The permeate is isolated from the feed water by the envelope-shaped membrane.

The mode of sealing can include adhesion with an adhesive, hot-melt, etc., fusion by heating, laser, etc., and insertion of a rubber-made sheet. Among others, sealing by adhesion is most simple and highly effective and therefore, is preferred.

On the feed-side face of the separation membrane, the inner-side end part in the winding direction can be closed by folding or sealing. When the feed-side face of the separation membrane is not folded but sealed, deflection is less likely to occur at the end part of the separation membrane. By virtue of suppressing the occurrence of deflection near a fold, formation of an air gap between separation membranes at the time of winding and generation of leakage due to the air gap can be prevented.

The separation membranes facing each other may have the same configuration or may have different configurations. More specifically, it is sufficient if the above-described permeate-side channel materials are provided on at least one surface out of two opposing permeate-side faces in the separation membrane element, and therefore, a separation membrane having permeate-side channel materials and a separation membrane not having the channel materials may be alternately stacked. However, for the convenience of explanation, in the description of the separation membrane element and matters related thereto, the "separation membrane" includes a separation membrane not having permeate-side channel materials (for example, a membrane having the same configuration as the separation membrane main body).

On the permeate-side face or the feed-side face, the separation membranes facing each other may be two different separation membranes or may be one membrane that is folded.

The width (first direction length) of the separation membrane can be determined according to the size of the pressure vessel used. As the width of the separation membrane is smaller, the length of the feed-side channel material becomes shorter and therefore, the pressure drop in the feed-side channel material is reduced. In the embodiment of the present invention, the width of the separation membrane is preferably 350 mm or less. The lower limit of the width of the separation membrane is not particularly limited, but the width of the separation membrane is, for example, 100 mm or more.

As for the length (second direction length) of the separation membrane, the number of separation membranes and the length of the separation membrane can be appropriately adjusted in accordance with the diameter of the pressure vessel used. As the length of the separation membrane is shorter, the length of the permeate-side channel materials becomes shorter and therefore, the pressure drop in the permeate-side flow path is reduced. The length of the separation membrane is preferably 1,500 mm or less. Also, as the number of separation membranes is increased, the length of the separation membrane can be shorter. For this reason, the number of separation membranes in one separation membrane element is preferably 1 or more when the side surface of the separation membrane element is in a size of 2 inch diameter.

On the other hand, when the number of separation membranes is large, the adhesion area between membranes increases and therefore, the effective membrane surface substantially functioning as a separation membrane decreases. Therefore, in the embodiment of the present invention, the length of the separation membrane is preferably 500 mm or more. In the case where the length of the separation membrane is 500 mm or more, the number of separation membranes in one separation membrane element may be 3 or less when the side surface of the separation membrane element is in a size of 2 inch diameter.

Incidentally, the width and length of the separation membrane as used herein include the width and length of the portion on which an adhesive is applied.

(2-3) Water Collecting Pipe

The water collecting pipe 8 may be configured in any way as long as the permeate flows therein, and the material, shape, size, etc. thereof are not particularly limited. As the water collecting pipe 8, for example, a cylindrical member having a side surface having provided therein a plurality of holes (not shown) as shown in FIG. 3 is used.

(2-4) Feed-Side Channel Material

The separation membrane element may have a feed-side channel material arranged to face the feed-side face of the separation membrane main body (see, FIG. 4). The feed-side channel material 6 may be sufficient if it is formed to create a flow path for feeding a raw fluid to the separation membrane main body 2, and this channel material is preferably provided to disturb the flow of a raw fluid so as to suppress the concentration polarization of the raw fluid.

As the feed-side channel material, a member having a continuous shape, such as film and net, can be used. Among others, from the standpoint of ensuring the flow path for a raw fluid and suppressing the concentration polarization, a net is preferably used.

In the feed-side flow path, the amount of a fluid passed can be larger than that in the permeate-side flow path and therefore, it can be most important to reduce the pressure drop, though stable formation of the flow path may also be important. For this reason, the projection area ratio of the feed-side channel material is preferably from 0.03 to 0.5, more preferably from 0.1 to 0.4, still more preferably from 0.15 to 0.35.

Figure 5:
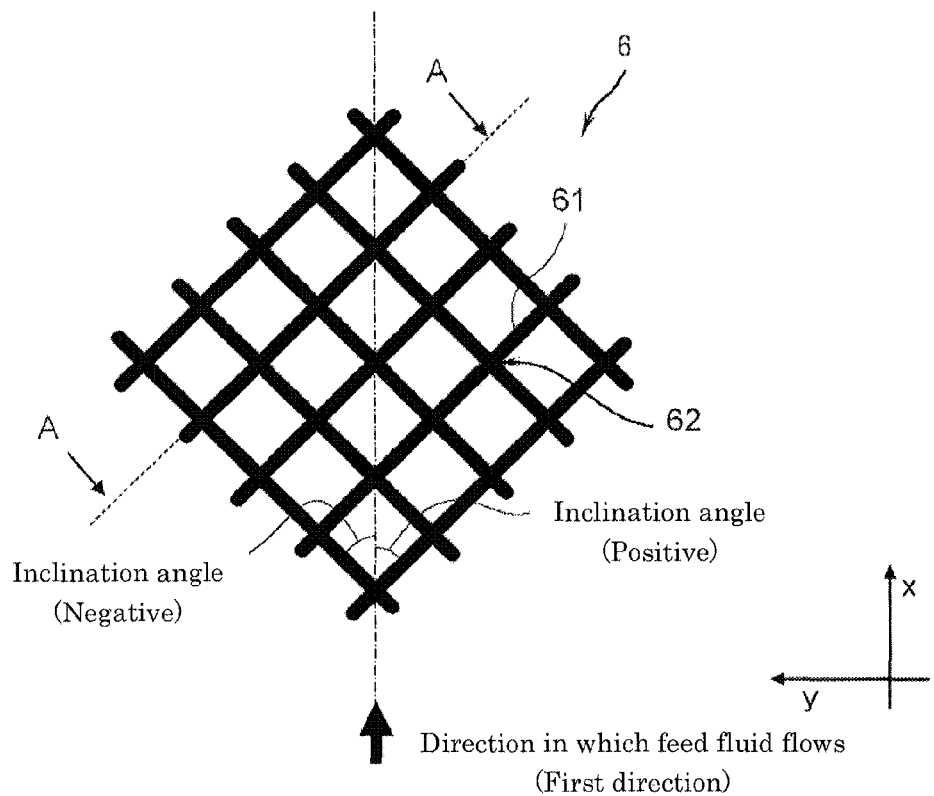
FIG. 5 is a plan view showing a form of the feed-side channel material (net).
Figure 6:
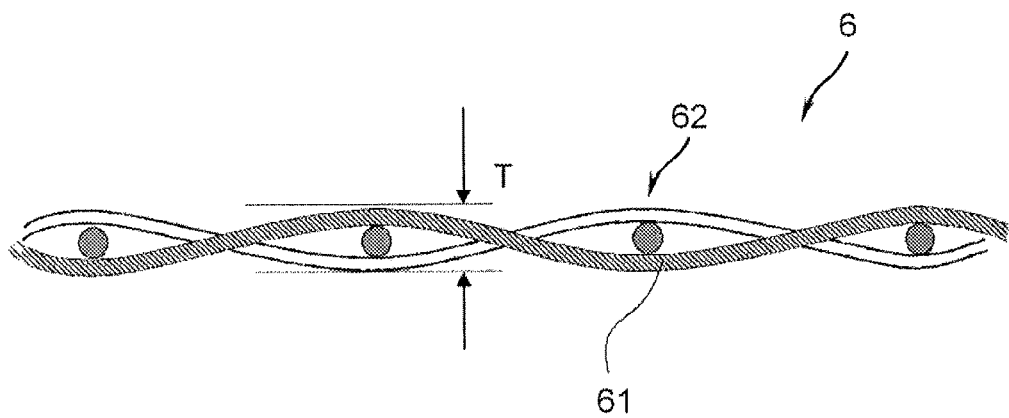
FIG. 6 is a cross-sectional view in the direction of arrow A-A of FIG. 5.

FIGS. 5 and 6 show a net as an example of the feed-side channel material 6. The feed-side channel material 6 of a net is constituted by a plurality of fibers 61. The plurality of fibers 61 intersect with each other at an intersection 62.

As the intersection interval of fibers in the feed-side channel material is wider, the pressure drop may be reduced, but the rigidity of the feed-side channel material becomes low. When the intersection interval is narrow, the rigidity of the feed-side channel material may be increased, but the pressure drop becomes large. In view of balance therebetween, the intersection interval of fibers in the feed fluid (raw fluid)-flowing direction (first direction) is preferably from 1.5 to 8 mm, more preferably from 1.8 to 5 mm.

In the feed-side channel material 6 shown in FIG. 5, as the inclination angle of the fiber 61 relative to the feed fluid-flowing direction (corresponds to the first direction in FIG. 5) is lower, the pressure drop may be reduced, but the rigidity becomes low. When the inclination angle is high, the rigidity may be increased, but the pressure drop becomes large. In view of balance therebetween, the inclination angle of the fiber 61 relative to the feed fluid-flowing direction of the feed-side channel material is preferably from 20° to 60° or from −60° to −20°, more preferably from 30° to 55° or from −55° to −30°. The inclination angle of the fiber inclined in the positive direction relative to the feed fluid-flowing direction and the inclination angle of the fiber inclined in the negative direction may be the same or different as long as it is from 20° to 60° or from −60° to −20°.

The fiber 61 is an example of the fiber constituting the net and may be a twisted or untwisted fiber and may be sufficient if it has a long, thin shape. As long as a feed-side channel material in a predetermined shape can be formed and the rigidity can be maintained, the cross-sectional shape of the fiber is not particularly limited and may be an ellipse, a circle, or a polygon such as triangle or quadrangle.

The thickness of the feed-side channel material is the maximum thickness and indicates, in a net, the thickness T of the intersection portion of fibers as shown in FIG. 6. A large thickness of the feed-side channel material may lead to a small pressure drop, but when formed into an element, i.e., when a separation membrane element is formed, the membrane area capable of filling into the vessel (presser vessel) becomes small. A small thickness may lead to a large membrane area capable of filling into the vessel when formed into an element, but the pressure drop of the feed-side flow path becomes large. In the separation membrane element of an embodiment of the present invention, the thickness of the feed-side channel material is preferably from 0.15 to 0.5 mm, more preferably from 0.25 to 0.45 mm.

The sum of the thickness of the permeate-side channel material and the thickness of the feed-side channel material is preferably from 0.4 to 0.75 mm, more preferably from 0.5 to 0.7 mm, so as to increase the filling membrane area and reduce the pressure drop in the separation membrane element.

The material of the feed-side channel material is not particularly limited as long as the rigidity as the feed-side channel material can be maintained and when a membrane leaf or a separation membrane element is formed, the membrane surface is not scratched, and the material may be the same as or different from the material of the separation membrane. For example, polyethylene and polypropylene are preferably used. The membrane leaf (sometimes simply referred to as "leaf") is a set of two separation membranes cut to a length suitable for the incorporation into an element and paired by arranging the feed-side faces to face each other (or one separation membrane folded with the feed-side face inside). In the membrane leaf, the feed-side channel material is sandwiched between the separation membranes.

(2-5) Permeate-Side Flow Path

As described above, the permeate-side flow path can be formed by the permeate-side channel materials provided on the separation membrane main body.

[3. Production Method of Separation Membrane Element]

In the production of the separation membrane element, a conventional element production apparatus may be used. As for the element production method, the methods described in reference documents (JP-B-44-14216, JP-B-4-11928, and JP-A-11-226366) can be used. Details are as follows.

(3-1) Production of Separation Membrane Main Body

An embodiment of the production method of the separation membrane main body is described above but can be simply described as follows.

A resin is dissolved in a good solvent, and the resin solution obtained is cast on a substrate and immersed in pure water to compound a porous support layer with the substrate. Thereafter, as described above, a separation functional layer is formed on the porous support layer. Furthermore, if desired, a chemical treatment with chlorine, an acid, an alkali, a nitrous acid, etc. is applied so as to enhance the separation performance and permeation performance and then, monomers, etc. are washed out to produce a continuous sheet of the separation membrane main body.

(3-2) Formation of Permeate-Side Flow Path

As described above, the permeate-side flow path can be formed by the permeate-side channel materials provided on the separation membrane main body. The method for arranging the channel materials is not particularly limited, but a roll-type coater, a nozzle-type hot-melt applicator, a spray-type hot-melt applicator, a flat-nozzle-type hot-melt applicator, a gravure method, an extrusion coater, printing, spraying, etc. may be used.

(3-3) Arrangement of Feed-Side Channel Material

In the case where the feed-side channel material is a continuously formed member such as net, the feed-side flow path can be formed by overlapping the separation membrane with the feed-side channel material.

In addition, feed-side channel materials having a discontinuous or continuous shape can be formed by directly applying a resin to the separation membrane. In the case where the flow path is formed by feed-side channel materials adhered to the separation membrane main body, the arrangement of the feed-side channel materials can also be regarded as a part of the production method of the separation membrane.

The flow path may also be formed by processing the separation membrane main body to impart ruggedness. The method for the processing to impart ruggedness can include embossing, hydraulic forming, and calendering. The embossing conditions, the embossing shape, etc. can be appropriately changed according to the performance, etc. required of the separation membrane element. This processing to impart ruggedness may be regarded as a part of the production method of the separation membrane.

(3-4) Stacking and Winding of Separation Membrane

One separation membrane can be folded and bonded together by arranging the permeate-side face to face inward, or two separation membranes can be overlapped with each other and bonded together by arranging the permeate-side faces to face inward, whereby an envelope-shaped membrane is formed. As described above, the envelope-shaped membrane is sealed at three sides. The sealing may be practiced, for example, by adhesion with an adhesive, a hot-melt, etc., or by thermal or laser fusion.

The adhesive used for the formation of an envelope-shaped membrane preferably has a viscosity of 40 to 150 ps (poise), more preferably from 50 to 120 ps. Occurrence of wrinkling in the separation membrane may cause a reduction in the performance of the separation membrane element, but when the viscosity of the adhesive is 150 ps or less, wrinkling is less likely to occur when winding the separation membrane around the water collecting pipe. In addition, when the viscosity of the adhesive is 40 ps or more, the adhesive is prevented from flowing out between separation membranes, and the risk of attachment of the adhesive to an unnecessary portion is reduced. Here, 1 ps is equal to 0.1 Pa·s.

The amount coated of the adhesive is preferably such an amount that after the separation membrane is wound around the water collecting pipe, the width of the portion coated with the adhesive is from 10 to 100 mm. By satisfying this condition, the separation membranes are unfailingly adhered and therefore, the raw fluid is prevented from flowing into the permeate side. In addition, a relatively large effective membrane area can be ensured.

The adhesive is preferably a urethane-based adhesive, and for adjusting the viscosity to a range of 40 to 150 ps, an adhesive obtained by mixing an isocyanate as a main ingredient and a polyol as a curing agent in a ratio of isocyanate:polyol=from 1:1 to 1:5 is preferred. As for the viscosity of the adhesive, the viscosity of each of the main ingredient alone, the curing agent alone, and the mixture in a specified blending ratio is previously measured by a Brookfield viscometer (JIS K 6833).

The thus adhesive-coated separation membrane can be arranged so that the closed portion of the envelope-shaped membrane can be located on the inner side in the winding direction, and the separation membrane is wound around the periphery of the water collecting pipe. In this way, the separation membrane is spirally wound.

(3-5) Other Steps

The production method of the separation membrane element may involve further winding a film, a filament, etc. on the outer side of the separation membrane roll formed as above or may involve other steps such as edge cutting for trimming the edge of the separation membrane in the longitudinal direction of the water collecting pipe, and attachment of an end plate.

[4. Utilization of Separation Membrane Element]

A raw fluid fed to the separation membrane element 100 is fed to the feed-side face 21 of the separation membrane 1. A part of the raw fluid passes through the separation membrane 1, whereby the raw fluid is separated into a permeated fluid and a concentrated fluid. The permeated fluid runs inside the envelope-shaped membrane, i.e., between two opposing permeate-side faces 22, and reaches the water collecting pipe 8. The permeated fluid flowed in the water collecting pipe 8 is discharged out of the separation membrane element 100 from the end part of the water collecting pipe 8. The concentrated fluid runs between two opposing feed-side faces 21 and flows out from the end part of the separation membrane element 100.

The separation membrane element may also be used as a separation membrane module by connecting the separation membrane elements in series or in parallel and housing the elements in a pressure vessel.

In addition, the separation membrane element or module above may be combined with a pump for feeding a fluid thereto, a device for pre-treating the fluid, and the like to constitute a fluid separation apparatus. By using this apparatus, for example, raw water can be separated into a permeate such as drinkable water and a concentrate that is not passed through the membrane, whereby water suited for the purpose can be obtained.

For the reason that a higher operating pressure of the fluid separation apparatus may lead to an enhanced salt rejection but an increase in the energy required for the operation, and in consideration of the durability of the composite semipermeable membrane, the operating pressure when passing water to be treated through the composite semipermeable membrane is preferably from 0.2 to 10 MPa. In this connection, the operating pressure is a so-called transmembrane pressure. The feed-water temperature is preferably from 5 to 45° C., because a high temperature leads to reduction in the salt rejection and along with drop of the temperature, the membrane permeate flux also decreases. Furthermore, if the pH of the feed water is high, scales of magnesium, etc. may be generated in the case of feed water having a high salt concentration, such as seawater, and in addition, the high pH operation may cause membrane deterioration. Therefore, operation in a neutral range is preferred.

The raw water to be treated with the separation membrane element includes a liquid mixture containing 500 mg/L to 100 g/L of TDS (Total Dissolved Solids), such as seawater, brackish water and wastewater. In general, TDS indicates the content of total dissolved solids and is expressed by "mass/volume" or "weight ratio" by regarding 1 L as 1 kg. According to the definition, the content can be calculated from the weight of a residue after a solution filtered through a 0.45-micron filter is evaporated at a temperature of 39.5 to 40.5° C., but more simply, the content is converted from the practical salinity.

EXAMPLES

Embodiments of the present invention are described in greater detail below by referring to Examples, but the present invention is not limited to these Examples.

(Thickness of Feed-Side Channel Material)

The thickness of the feed-side channel material was shown by an average value of 10 points after observing the cross-section of the feed-side channel material from the plane direction thereof and analyzing the photographed image, thereby measuring the thickness at 10 intersection portions.

(Number of Intersections of Feed-Side Channel Material)

The feed-side channel material was measured for the number of intersections, the intersection interval, and the inclination angle of fiber as follows. The feed-side channel material was observed from a direction perpendicular to the feed-side channel material face by a digital microscope (VHX-900), the number of intersections in a square of 1 cm×1 cm was counted by analyzing the photographed image, and the average value of 10 portions was taken as the number of intersections.

(Intersection Interval of Feed-Side Channel Material)

The intersection interval in the first direction of the feed-side channel material was measured as follows. The feed-side channel material was observed from a direction perpendicular to the feed-side channel material face by a digital microscope (VHX-900), and the intersection interval was calculated by analyzing the photographed image. In this way, the interval was measured at 10 portions, and the average value of measured values was calculated as the intersection interval.

(Inclination Angle of Fiber of Feed-Side Channel Material)

As for the inclination angle from the first direction of the constituent fiber (fiber) of the feed-side channel material, the feed-side channel material was observed from a direction perpendicular to the feed-side channel material face by a digital microscope (VHX-900), and the inclination angle of fiber (fiber) of the feed-side channel material was calculated by analyzing the photographed image. The measurement was performed at 10 portions, and the inclination angle was shown by the average value.

(Spacing and Difference in Height of Permeate-Side Channel Materials)

Arbitrary 30 cross-sections of the permeate-side channel materials were photographed at a magnification of 500 times by using a scanning electron microscope (S-800) (manufactured by Hitachi, Ltd.), and the thickness of the permeate-side channel materials and the spacings between adjacent permeate-side channel materials were measured in the photographed image.

(Rate of Water Production and Membrane Permeate Flux)

A salt solution at a concentration of 500 mg/L and a pH of 6.5 was used as the feed water, and by operating the separation under the conditions of an operating pressure of 0.45 MPa and an operating temperature of 25° C., the rate of water production per day (L/day) obtained with one separation membrane element and the membrane permeate flux ($m^3/(m^2 \cdot day)$) obtained by dividing the rate of water production by the effective membrane area of the separation membrane element were measured and calculated.

(Salt Rejection (TDS Rejection))

The electrical conductivity of permeate obtained by the same operation as in the measurement of the rate of water production above was measured, and the TDS concentration was calculated. This TDS concentration of the permeate and the TDS concentration of the feed water were applied to the following formula to calculate the TDS rejection:

TDS rejection(%)=100×{1−(TDS concentration in permeate/TDS concentration in feed water)}

Example 1

A 15.0 wt % DMF solution of polysulfone was cast to a thickness of 180 μm at room temperature (25° C.) on a nonwoven fabric (fiber diameter: 1 decitex, thickness: 98 μm, air permeability: 0.9 cc/cm$^2$/sec, degree of fiber orientation: surface layer on the porous support layer side: 40° and surface layer opposite to the porous support side: 20°) obtained by a papermaking method from a polyethylene terephthalate fiber, and the fabric was immediately immersed in pure water and left standing for 5 minutes to produce a fiber-reinforced polysulfone supporting membrane roll having a thickness of 130 μm.

Thereafter, the support membrane roll was unwound, and an aqueous solution containing 1.8 wt % of m-PDA and 4.5 wt % of ε-caprolactam was applied to the polysulfone surface. After blowing nitrogen through an air nozzle to remove an excess aqueous solution from the support membrane surface, an n-decane solution at 25° C. containing 0.06 wt % of trimesoyl chloride was applied to completely wet the surface. Thereafter, an excess solution was removed from the membrane by air blowing, and the membrane was washed with hot water at 50° C., immersed in an aqueous 3.5% glycerin solution for 1 minute, and treated in a hot-air oven at 100° C. for 1 minute to obtain a separation membrane roll in a semi-dried state.

Subsequently, a wall-shaped material (permeate-side channel materials) having a thickness of 0.25 mm and having a trapezoidal cross-sectional shape when observed from the longitudinal direction of a water collecting pipe was obtained by linearly applying a resin to make a line perpendicular to the longitudinal direction of the water collecting pipe and continue from the inner-side end part to the outer-side end part in the winding direction. Specifically, an ethylene vinyl acetate copolymer resin (703A) was applied to the permeate-side face of the separation membrane roll at a resin temperature of 125° C. and a running speed of 3 m/min by using an applicator equipped with a comb-shaped shim in which each of the groove width and the line width is 0.5 mm.

The obtained separation membrane was folded by arranging the feed-side faces to face each other, and a net (thickness: 0.5 mm, intersection interval: 4 mm, inclination angle of fiber: 45°) was inserted as a feed-side channel material between the feed-side faces to obtain a membrane leaf.

Two sheets of the thus-obtained membrane leaf were spirally wound, from the end part of the permeate-side channel materials, around an ABS-made water collecting pipe (width: 300 mm, diameter: 17 mm, number of holes of 12×one linear row), and a film was further wound on the outer periphery and secured with a tape. Thereafter, edge cutting, end plate attachment and filament winding were performed to produce a spiral-type element in which the diameter of the separation membrane portion is 2 inches.

In the thus-obtained spiral-type separation membrane element, the effective membrane area was 0.44 m$^2$, the length (second direction length) of the membrane leaf was 550 mm, the width (first direction length) of the membrane leaf was 237 mm, and the number of separation membranes was 2.

This separation membrane element was housed in a pressure vessel and operated under the above-described conditions, as a result, the rate of water production, the membrane permeate flux and the salt rejection were as shown in Table 1. Incidentally, the recovery ratio in the operation above was 15%.

Example 2

Production and operation of a separation membrane element were performed in the same manner as in Example 1 except that a net having a thickness of 0.35 mm was used, the length of the membrane leaf was changed to 660 mm, and the effective membrane area became 0.53 m$^2$. The rate of water production, the membrane permeate flux and the salt rejection were as shown in Table 1.

Example 3

Production and operation of a separation membrane element were performed in the same manner as in Example 1 except that a net having a thickness of 0.2 mm was used, the length of the membrane leaf was changed to 830 mm, and the effective membrane area became 0.66 m$^2$. The rate of water production, the membrane permeate flux and the salt rejection were as shown in Table 1.

Example 4

Production and operation of a separation membrane element were performed in the same manner as in Example 1 except that a net having a thickness of 0.18 mm was used, the length of the membrane leaf was changed to 910 mm, and the effective membrane area became 0.73 m$^2$. The rate of water production, the membrane permeate flux and the salt rejection were as shown in Table 1.

Example 5

Production and operation of a separation membrane element were performed in the same manner as in Example 1 except that a net having a thickness of 0.2 mm was used, the length of the membrane leaf was changed to 830 mm, the width of the membrane leaf was changed to 0.4 m, and the effective membrane area became 1.16 m$^2$. The rate of water production, the membrane permeate flux and the salt rejection were as shown in Table 1.

Example 6

Production and operation of a separation membrane element were performed in the same manner as in Example 1 except that a net having a thickness of 0.2 mm was used, the length of the membrane leaf was changed to 1,690 mm, the number of the membrane leaves was changed to 1, and the effective membrane area became 0.70 m$^2$. The rate of water production, the membrane permeate flux and the salt rejection were as shown in Table 1.

Example 7

Production and operation of a separation membrane element were performed in the same manner as in Example 1 except that a net having a thickness of 0.2 mm was used, the length of the membrane leaf was changed to 370 mm, the number of the membrane leaves was changed to 3, and the effective membrane area became 0.44 m². The rate of water production, the membrane permeate flux and the salt rejection were as shown in Table 1.

Example 8

Production and operation of a separation membrane element were performed in the same manner as in Example 1 except that the thickness of the wall-shaped material was changed to 0.15 mm by adjusting the amount of the resin discharged, the length of the membrane leaf was changed to 620 mm, and the effective membrane area became 0.5 m². The rate of water production, the membrane permeate flux and the salt rejection were as shown in Table 1.

Example 9

Production and operation of a separation membrane element were performed in the same manner as in Example 1 except that a net having a thickness of 0.35 mm was used, the thickness of the wall-shaped material was changed to 0.38 mm by adjusting the amount of the resin discharged, the length of the membrane leaf was changed to 570 mm, and the effective membrane area became 0.46 m². The rate of water production, the membrane permeate flux and the salt rejection were as shown in Table 1.

Example 10

Production and operation of a separation membrane element were performed in the same manner as in Example 1 except that the thickness of the wall-shaped material was changed to 0.11 mm by adjusting the amount of the resin discharged, the length of the membrane leaf was changed to 660 mm, and the effective membrane area became 0.53 m². The rate of water production, the membrane permeate flux and the salt rejection were as shown in Table 1.

Example 11

Production and operation of a separation membrane element were performed in the same manner as in Example 1 except that a net having a thickness of 0.34 mm was used and the thickness of the wall-shaped material was changed to 0.41 mm by adjusting the amount of the resin discharged. The rate of water production, the membrane permeate flux and the salt rejection were as shown in Table 2.

Example 12

Production and operation of a separation membrane element were performed in the same manner as in Example 1 except that a net having a thickness of 0.2 mm was used, the thickness of the wall-shaped material was changed to 0.2 mm by adjusting the amount of the resin discharged, the length of the membrane leaf was changed to 610 mm, the number of the membrane leaves was changed to 3, and the effective membrane area became 0.71 m². The rate of water production, the membrane permeate flux and the salt rejection were as shown in Table 2.

Example 13

Production and operation of a separation membrane element were performed in the same manner as in Example 1 except that the width of the separation membrane was changed to 254 mm and the effective membrane area became 0.47 m². The rate of water production, the membrane permeate flux and the salt rejection were as shown in Table 2.

Example 14

Production and operation of a separation membrane element were performed in the same manner as in Example 2 except that the intersection interval in the first direction of the feed-side channel material was changed to 2.5 mm. The rate of water production, the membrane permeate flux and the salt rejection were as shown in Table 2.

Example 15

Production and operation of a separation membrane element were performed in the same manner as in Example 2 except that the intersection interval in the first direction of the feed-side channel material was changed to 6.0 mm. The rate of water production, the membrane permeate flux and the salt rejection were as shown in Table 2.

Example 16

Production and operation of a separation membrane element were performed in the same manner as in Example 2 except that the inclination angle of fiber from the first direction of the feed-side channel material was changed to 25°. The rate of water production, the membrane permeate flux and the salt rejection were as shown in Table 2.

Example 17

Production and operation of a separation membrane element were performed in the same manner as in Example 2 except that the inclination angle of fiber from the first direction of the feed-side channel material was changed to 55°. The rate of water production, the membrane permeate flux and the salt rejection were as shown in Table 2.

Example 18

Production and operation of a separation membrane element were performed in the same manner as in Example 2 except that the permeate-side channel materials were formed by using a hot-melt applicator equipped with a comb-shaped shim in which each of the groove width and the line width is 0.3 mm. The rate of water production, the membrane permeate flux and the salt rejection were as shown in Table 2.

Example 19

Production and operation of a separation membrane element were performed in the same manner as in Example 2 except that the permeate-side channel materials were formed by using a hot-melt applicator equipped with a comb-shaped shim in which each of the groove width and the line width is 0.7 mm. The rate of water production, the membrane permeate flux and the salt rejection were as shown in Table 2.

Example 20

Production and operation of a separation membrane element were performed in the same manner as in Example 1 except that the length of the membrane leaf was changed to 1,100 mm, the number of the membrane leaves was changed to 1, and the effective membrane area became 0.45 m². The rate of water production, the membrane permeate flux and the salt rejection were as shown in Table 2.

Comparative Example 1

Production and operation of a separation membrane element were performed in the same manner as in Example 1 except that a net having a thickness of 0.7 mm was used, the length of the membrane leaf was changed to 450 mm, the effective membrane area became 0.36 m², and a tricot (thickness: 0.25 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Comparative Example 2

Production and operation of a separation membrane element were performed in the same manner as in Example 1 except that a tricot (thickness: 0.25 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Comparative Example 3

Production and operation of a separation membrane element were performed in the same manner as in Example 1 except that a net having a thickness of 0.35 mm was used, the length of the membrane leaf was changed to 660 mm, the effective membrane area became 0.53 m², and a tricot (thickness: 025 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Comparative Example 4

Production and operation of a separation membrane element were performed in the same manner as in Example 1 except that a net having a thickness of 0.2 mm was used, the length of the membrane leaf was changed to 830 mm, the effective membrane area became 0.66 m², and a tricot (thickness: 0.25 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Comparative Example 5

Production and operation of a separation membrane element were performed in the same manner as in Example 1 except that a net having a thickness of 0.12 mm was used, the length of the membrane leaf was changed to 910 mm, the effective membrane area became 0.73 m², and a tricot (thickness: 0.25 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Comparative Example 6

Production and operation of a separation membrane element were performed in the same manner as in Example 1 except that a net having a thickness of 0.2 mm was used, the length of the membrane leaf was changed to 830 mm, the width of the membrane leaf was changed to 400 mm, the effective membrane area became 1.16 m², and a tricot (thickness: 0.25 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Comparative Example 7

Production and operation of a separation membrane element were performed in the same manner as in Example 1 except that a net having a thickness of 0.7 mm was used, the length of the membrane leaf was changed to 450 mm, and the effective membrane area became 0.36 m². The rate of water production, the membrane permeate flux and the salt rejection were as shown in Table 3.

Comparative Example 8

Production and operation of a separation membrane element were performed in the same manner as in Example 1 except that a net having a thickness of 0.12 mm was used, the length of the membrane leaf was changed to 910 mm, and the effective membrane area became 0.73 m². The rate of water production, the membrane permeate flux and the salt rejection were as shown in Table 3.

Comparative Example 9

Production and operation of a separation membrane element were performed in the same manner as in Example 1 except that a net having a thickness of 0.42 mm was used, the length of the membrane leaf was changed to 370 mm, the number of the membrane leaves was changed to 3, the effective membrane area became 0.42 m², and a tricot (thickness: 0.25 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Comparative Example 10

Production and operation of a separation membrane element were performed in the same manner as in Example 1 except that a net having a thickness of 0.2 mm was used, the length of the membrane leaf was changed to 1,690 mm, the number of the membrane leaves was changed to 1, the effective membrane area became 0.70 m², and a tricot (thickness: 0.25 mm, groove width: 0.2 mm, ridge width: 0.3 mm, groove depth: 0.105 mm) was used as the permeate-side channel materials. The rate of water production, the membrane permeate flux and the salt rejection were as shown in Table 3.

Element configurations and element performances of Examples and Comparative Examples are shown together in Tables 1 to 3.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Number of leaves | — | 2 | 2 | 2 | 2 | 2 | 1 | 3 | 2 | 2 | 2 |
| Leaf length | mm | 550 | 660 | 830 | 910 | 830 | 1690 | 370 | 620 | 570 | 660 |
| Leaf width | mm | 237 | 237 | 237 | 237 | 400 | 237 | 237 | 237 | 237 | 237 |
| Membrane area | $m^2$ | 0.52 | 0.63 | 0.79 | 0.86 | 1.33 | 0.80 | 0.53 | 0.59 | 0.54 | 0.63 |
| Effective membrane area | $m^2$ | 0.44 | 0.53 | 0.66 | 0.73 | 1.16 | 0.70 | 0.44 | 0.50 | 0.46 | 0.53 |
| Feed-side channel material Thickness | mm | 0.5 | 0.35 | 0.2 | 0.15 | 0.2 | 0.2 | 0.42 | 0.5 | 0.35 | 0.5 |
| Feed-side channel material Intersection interval | mm | 4.0 | 4.0 | 4.0 | 4.0 | 4.0 | 4.0 | 4.0 | 4.0 | 4.0 | 4.0 |
| Feed-side channel material Inclination angle of fiber | ° | 45 | 45 | 45 | 45 | 45 | 45 | 45 | 45 | 45 | 45 |
| Permeate-side channel materials Mode | — | stripe | stripe | stripe | stripe | stripe | stripe | stripe | stripe | stripe | stripe |
| Permeate-side channel materials Thickness | mm | 0.25 | 0.25 | 0.25 | 0.25 | 0.25 | 0.25 | 0.25 | 0.15 | 0.38 | 0.11 |
| Permeate-side channel materials Spacing | mm | 0.5 | 0.5 | 0.5 | 0.5 | 0.5 | 0.5 | 0.5 | 0.5 | 0.5 | 0.5 |
| Rate of water production with separation membrane element | L/day | 407 | 493 | 609 | 637 | 1138 | 562 | 419 | 437 | 433 | 422 |
| Membrane permeate flux | $m^3/(m^2 \cdot d)$ | 0.92 | 0.93 | 0.92 | 0.87 | 1.01 | 0.80 | 0.94 | 0.88 | 0.95 | 0.80 |
| Salt rejection | % | 98.7 | 98.9 | 99.0 | 99.0 | 98.9 | 98.9 | 98.8 | 98.7 | 98.9 | 98.6 |

TABLE 2

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Number of leaves | — | 2 | 3 | 2 | 2 | 2 | 2 | 2 | 2 | 2 | 1 |
| Leaf length | mm | 550 | 610 | 550 | 660 | 660 | 660 | 660 | 660 | 660 | 1100 |
| Leaf width | mm | 237 | 237 | 254 | 237 | 237 | 237 | 237 | 237 | 237 | 237 |
| Membrane area | $m^2$ | 0.52 | 0.87 | 0.56 | 0.63 | 0.63 | 0.63 | 0.63 | 0.63 | 0.63 | 0.52 |
| Effective membrane area | $m^2$ | 0.44 | 0.71 | 0.47 | 0.53 | 0.53 | 0.53 | 0.53 | 0.53 | 0.53 | 0.45 |
| Feed-side channel material Thickness | mm | 0.34 | 0.2 | 0.5 | 0.35 | 0.35 | 0.35 | 0.35 | 0.35 | 0.35 | 0.5 |
| Feed-side channel material Intersection interval | mm | 4.0 | 4.0 | 4.0 | 2.5 | 6.0 | 4.0 | 4.0 | 4.0 | 4.0 | 4.0 |
| Feed-side channel material Inclination angle of fiber | ° | 45 | 45 | 45 | 45 | 45 | 25 | 55 | 45 | 45 | 45 |
| Permeate-side channel materials Mode | — | stripe | stripe | stripe | stripe | stripe | stripe | stripe | stripe | stripe | stripe |
| Permeate-side channel materials Thickness | mm | 0.41 | 0.2 | 0.25 | 0.25 | 0.25 | 0.25 | 0.25 | 0.25 | 0.25 | 0.25 |
| Permeate-side channel materials Spacing | mm | 0.5 | 0.5 | 0.5 | 0.5 | 0.5 | 0.5 | 0.5 | 0.3 | 0.7 | 0.5 |
| Rate of water production with separation membrane element | L/day | 417 | 673 | 431 | 499 | 487 | 491 | 490 | 456 | 462 | 393 |
| Membrane permeate flux | $m^3/(m^2 \cdot d)$ | 0.95 | 0.95 | 0.91 | 0.94 | 0.92 | 0.93 | 0.92 | 0.86 | 0.87 | 0.86 |
| Salt rejection | % | 98.9 | 99.0 | 98.7 | 98.9 | 98.9 | 98.9 | 98.9 | 98.9 | 98.9 | 98.9 |

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Number of leaves | — | 2 | 2 | 2 | 2 | 2 | 2 | 2 | 2 | 3 | 1 |
| Leaf length | mm | 450 | 550 | 660 | 830 | 910 | 830 | 450 | 910 | 370 | 1690 |
| Leaf width | mm | 237 | 237 | 237 | 237 | 237 | 400 | 237 | 237 | 237 | 237 |
| Membrane area | $m^2$ | 0.43 | 0.52 | 0.63 | 0.79 | 0.86 | 1.33 | 0.43 | 0.86 | 0.53 | 0.80 |
| Effective membrane area | $m^2$ | 0.36 | 0.44 | 0.53 | 0.66 | 0.73 | 1.16 | 0.36 | 0.73 | 0.42 | 0.70 |
| Feed-side channel material Thickness | mm | 0.70 | 0.50 | 0.35 | 0.20 | 0.12 | 0.20 | 0.70 | 0.12 | 0.42 | 0.2 |
| Feed-side channel material Intersection interval | mm | 4.0 | 4.0 | 4.0 | 4.0 | 4.0 | 4.0 | 4.0 | 4.0 | 4.0 | 4.0 |
| Feed-side channel material Inclination angle of fiber | ° | 45 | 45 | 45 | 45 | 45 | 45 | 45 | 45 | 45 | 45 |
| Permeate-side channel materials Mode | — | tricot | tricot | tricot | tricot | tricot | tricot | stripe | stripe | tricot | tricot |
| Permeate-side channel materials Thickness | mm | 0.25 | 0.25 | 0.25 | 0.25 | 0.25 | 0.25 | 0.25 | 0.25 | 0.25 | 0.25 |
| Permeate-side channel materials Spacing | mm | — | — | — | — | — | — | 0.5 | 0.5 | — | — |

TABLE 3-continued

|  | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Rate of water production with separation membrane element | L/day | 300 | 370 | 440 | 529 | 537 | 954 | 327 | 613 | 387 | 403 |
| Membrane permeate flux | m$^3$/(m$^2$ · d) | 0.83 | 0.84 | 0.83 | 0.80 | 0.74 | 0.82 | 0.91 | 0.84 | 0.92 | 0.58 |
| Salt rejection | % | 98.5 | 98.7 | 98.8 | 98.9 | 98.9 | 98.9 | 98.5 | 99.0 | 98.8 | 98.6 |

As seen from Tables 1 to 3, by using a separation membrane element obtained by spirally winding a separation membrane main body having a feed-side face and a permeate-side face, a feed-side channel material and a permeate-side channel materials, around the periphery of a water collecting pipe, in which the permeate-side channel materials are discontinuously provided in the first direction that is the width direction of the separation membrane main body and the thickness of the feed-side channel material is from 0.15 to 0.5 mm, the loading efficiency of the separation membrane can be enhanced and moreover, the flow resistance on the permeate side can be reduced, making it possible to achieve both an increase in the amount of the permeate per unit membrane area and an increase in the amount of the permeate per separation membrane element.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2012-145160) filed on Jun. 28, 2012, the contents of which are incorporated herein by reference.

DESCRIPTION OF REFERENCE NUMERALS AND SIGNS

1 Separation membrane
2 Separation membrane main body
21 Feed-side face
22 Permeate-side face
3 Permeate-side channel materials
5 Permeate-side flow path
6 Feed-side channel material
61 Fiber
62 Intersection
7 Separation membrane
71 Feed-side face
72 Permeate-side face
8 Water collecting pipe
100 Separation membrane element
T Thickness of feed-side channel material

The invention claimed is:

1. A separation membrane element comprising a water collecting pipe, a separation membrane main body having a feed-side face and a permeate-side face, a feed-side channel material, and permeate-side channel materials,
   where the feed-side channel material has a plurality of fibers intersecting with each other, and an interval between intersections of the fibers in the first direction is from 1.5 to 8 mm, and the fibers are inclined a 20° to 60° or at −60° to −20° relative to the first direction,
   wherein the separation membrane main body, the feed-side channel material and the permeate-side channel material are spirally wound around the water collecting pipe,
   a plurality of the permeate-side channel materials are discontinuously provided on the permeate-side face of the separation membrane main body, along a first direction that is a longitudinal direction of the water collecting pipe, and
   the feed-side channel material has a thickness of from 0.15 to 0.5 mm.

2. The separation membrane element according to claim 1, wherein a length of the separation membrane main body in the first direction is from 100 to 350 mm.

3. The separation membrane element according to claim 1, wherein a length of the separation membrane main body in a second direction perpendicular to the first direction is from 500 to 1,700 mm.

4. The separation membrane element according to claim 1, wherein the permeate-side channel materials have a thickness of from 0.12 to 0.4 mm.

5. The separation membrane element according to claim 1, wherein spacings between the permeate-side channel materials adjacent to each other along the first direction are from 0.2 to 1.5 mm.

6. The separation membrane element according to claim 1, wherein a sum of the thickness of the feed-side channel material and the thickness of the permeate-side channel materials is from 0.4 to 0.75 mm.

7. The separation membrane element according to claim 1, wherein a length of the separation membrane main body in the first direction is from 220 to 260 mm, a length of the separation membrane main body in a second direction perpendicular to the first direction is from 1,000 to 1,700 mm, and the number of pieces of the separation membrane main body is 1.

8. The separation membrane element according to claim 1, wherein a length of the separation membrane main body in the first direction is from 220 to 260 mm, a length of the separation membrane main body in a second direction perpendicular to the first direction is from 500 to 1,000 mm, and the number of pieces of the separation membrane main body is 2.

9. The separation membrane element according to claim 1, wherein a length of the separation membrane main body in the first direction is from 220 to 260 mm, a length of the separation membrane main body in a second direction perpendicular to the first direction is from 350 to 700 mm, and the number of pieces of the separation membrane main body is 3.

* * * * *